United States Patent [19]

Hancock et al.

[11] Patent Number: 5,186,017

[45] Date of Patent: Feb. 16, 1993

[54] REFRIGERANT RECOVERY DEVICE

[75] Inventors: John P. Hancock; Ralph A. McClelland, both of Indianapolis, Ind.

[73] Assignee: K-Whit Tools, Inc., Fishers, Ind.

[21] Appl. No.: 901,800

[22] Filed: Jun. 22, 1992

Related U.S. Application Data

[63] Continuation-in-part of Ser. No. 579,779, Sep. 10, 1990, abandoned.

[51] Int. Cl.⁵ .................................................. F25B 45/00
[52] U.S. Cl. .................................... 62/292; 62/149; 62/77
[58] Field of Search ................ 62/77, 85, 149, 292, 62/475; 141/59, 89

[56] References Cited

U.S. PATENT DOCUMENTS

| Re. 33,212 | 5/1990 | Lower | 62/292 |
|---|---|---|---|
| 1,938,205 | 12/1933 | Yeomans | 62/85 |
| 2,044,096 | 6/1936 | Moran | 62/292 |
| 2,321,964 | 6/1943 | Zieber | 62/115 |
| 2,341,429 | 2/1944 | Elsey | 62/475 |
| 2,341,430 | 2/1944 | Elsey | 62/475 |
| 2,577,598 | 12/1951 | Zwickle | 62/475 |
| 2,590,061 | 3/1952 | Ash | 62/7 |
| 2,865,442 | 12/1958 | Halford et al. | 158/36.3 |
| 2,917,110 | 12/1959 | Brohl | 62/149 |
| 2,986,894 | 6/1961 | Endress | 62/475 |
| 3,131,548 | 5/1964 | Chubb et al. | 62/475 |
| 3,177,680 | 4/1965 | Rasovich et al. | 62/471 |
| 3,232,070 | 2/1966 | Sparano | 62/292 |
| 3,357,197 | 12/1967 | Massengale | 62/77 |
| 3,478,529 | 11/1969 | Boykin | 62/85 |
| 3,729,949 | 5/1973 | Talbot | 62/149 |
| 3,915,857 | 10/1975 | Olson | 210/62 |
| 4,110,998 | 9/1978 | Owen | 62/292 |
| 4,156,149 | 6/1980 | Sciortino | 262/1 |
| 4,261,178 | 4/1981 | Cain | 62/292 |
| 4,285,206 | 8/1981 | Koser | 62/292 |
| 4,304,102 | 12/1981 | Gray | 62/475 |
| 4,363,222 | 12/1982 | Cain | 62/292 |
| 4,364,236 | 12/1982 | Lower et al. | 62/77 |
| 4,441,330 | 4/1984 | Lower et al. | 62/149 |
| 4,470,265 | 9/1984 | Correla | 62/77 |
| 4,476,688 | 10/1984 | Goddard | 62/149 |
| 4,480,446 | 11/1984 | Margulefsky | 62/292 |
| 4,513,578 | 4/1985 | Proctor | 62/292 |
| 4,523,897 | 6/1985 | Lower et al. | 417/244 |
| 4,539,817 | 9/1985 | Staggs et al. | 62/292 |

(List continued on next page.)

FOREIGN PATENT DOCUMENTS

| 0071062 | 2/1983 | European Pat. Off. . |
| 0313079 | 4/1989 | European Pat. Off. . |
| 2056646A | 3/1981 | United Kingdom . |

Primary Examiner—John Sollecito
Attorney, Agent, or Firm—Ice, Miller, Donadio & Ryan

[57] ABSTRACT

A device is disclosed for recovering refrigerant from a mechanical refrigeration system having a high pressure port through which refrigerant can be withdrawn from the system, and a low pressure port through which refrigerant can be withdrawn from the system. The purging device includes a refrigerant storage tank having a first entry port and second entry port. A first refrigerant conduit extends between the high pressure port of the mechanical refrigeration system and the first entry port of the refrigerant storage tank. A second refrigerant conduit extends between the low pressure port of the mechanical refrigeration system and the second entry portion of the refrigerant storage tank. A selectively actuable first flow control arrangement is disposed in the second refrigerant conduit for controlling the flow of refrigerant, to permit the refrigerant to flow from the refrigerant storage tank into the mechanical refrigeration system when the device is in a liquid refrigerant recovery mode of operation, and to permit the refrigerant to flow from the mechanical refrigeration system into the refrigerant storage tank when the device is in a gaseous refrigerant recovery mode of operation.

15 Claims, 4 Drawing Sheets

U.S. PATENT DOCUMENTS

| | | | |
|---|---|---|---|
| 4,554,792 | 11/1985 | Margulefsky | 62/297 |
| 4,614,231 | 9/1986 | Proctor | 165/153 |
| 4,624,112 | 11/1986 | Proctor | 62/292 |
| 4,646,527 | 3/1987 | Taylor | 62/85 |
| 4,688,388 | 8/1987 | Lower et al. | 62/292 |
| 4,768,347 | 9/1988 | Manz et al. | 62/149 |
| 4,776,733 | 8/1988 | Scuderi | 62/77 |
| 4,798,055 | 1/1989 | Murray et al. | 62/127 |
| 4,805,416 | 2/1989 | Manz et al. | 62/292 |
| 4,809,520 | 3/1989 | Manz et al. | 62/292 |
| 4,862,699 | 9/1989 | Lounis | 62/292 |
| 4,878,356 | 11/1989 | Punches | 62/149 |
| 4,909,042 | 3/1990 | Proctor | 62/292 |
| 4,916,915 | 4/1990 | Flinchbaugh | 62/129 |
| 4,938,031 | 7/1990 | Manz et al. | 62/292 |
| 4,939,905 | 7/1990 | Manz | 62/77 |
| 4,942,741 | 7/1990 | Hancock et al. | 62/292 |
| 5,005,375 | 4/1991 | Manz et al. | 62/292 |
| 5,036,675 | 8/1991 | Anderson, Jr. | 62/475 |
| 5,042,271 | 8/1991 | Manz | 62/292 |

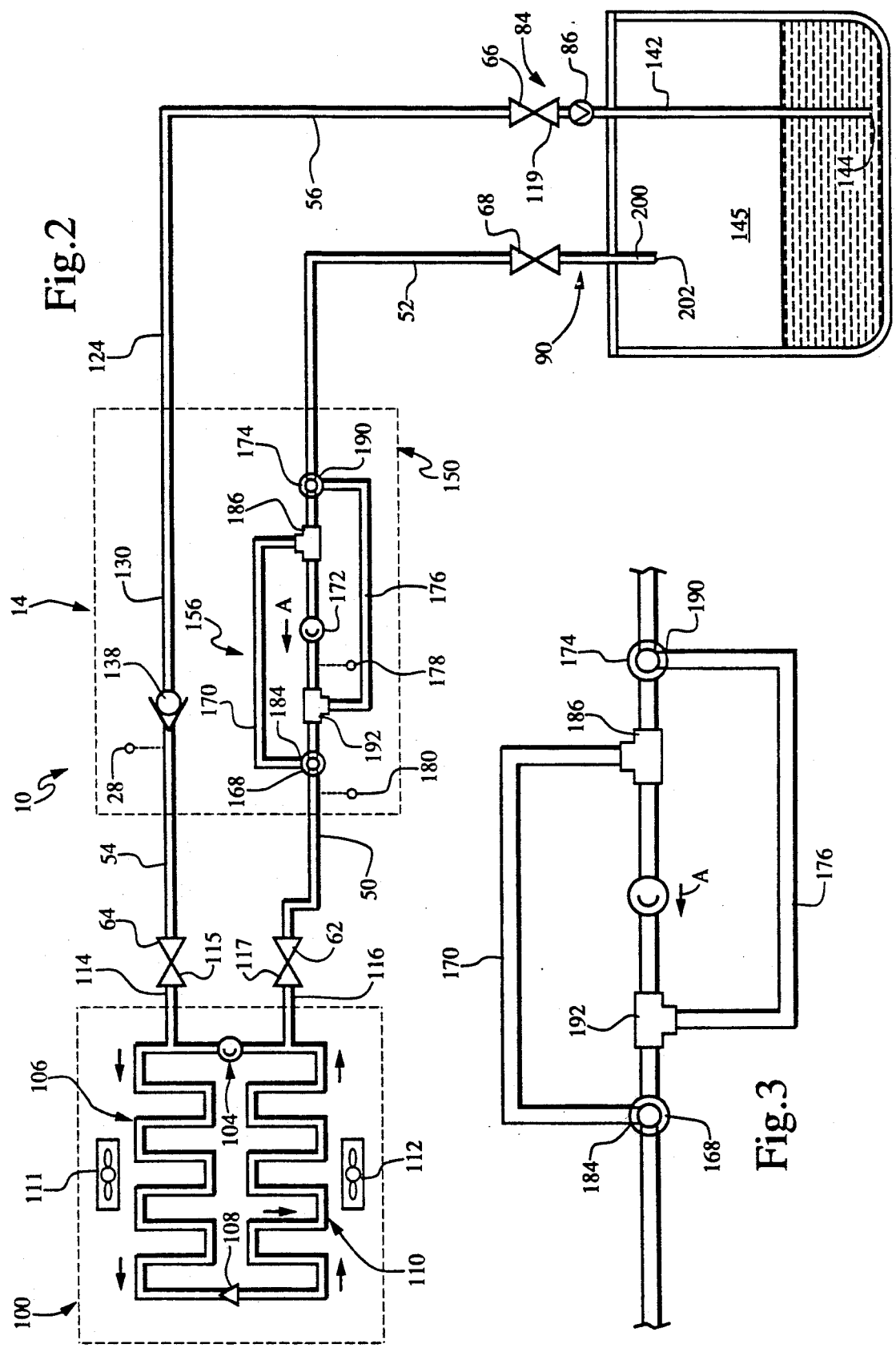

REFRIGERANT RECOVERY DEVICE

The instant application is a continuation in part of Hancock and McClelland U.S. patent application Ser. No. 07/579,779, filed on Sep. 10, 1990, which was abandoned after the filing of this Application.

TECHNICAL FIELD OF THE INVENTION

The present invention relates to devices for servicing mechanical refrigeration equipment, and more particularly to a device for recovering refrigerant from a mechanical refrigeration system.

BACKGROUND OF THE INVENTION

A wide variety of mechanical refrigeration systems are in use currently in a wide variety of applications. These applications include refrigerators, heat pumps, and air conditioners used both in vehicles and in buildings. The vast majority of mechanical refrigeration systems operate according to similar, well known principles, employing a closed-loop fluid circuit through which refrigerant flows. Fluorocarbon refrigerants (such as DUPONT FREON brand refrigerant) are the types of refrigerants used most widely today. DUPONT and FREON are registered trademarks of E. I. DuPont de Nemours & Company of Wilmington, Del.

Mechanical refrigeration systems periodically require servicing. This servicing often takes the form of the addition of refrigerant into the system to replace refrigerant which has escaped from the system. Other servicing often takes the form of repairs to, or replacements of components in the system such as compressors, evaporators, filters, dryers, expansion valves and condensers.

Before adding refrigerant, or repairing or replacing one or more components, it is often necessary to remove the refrigerant remaining in the system. Typically, this remaining refrigerant is removed by bleeding off the refrigerant to the atmosphere.

In recent years, much concern has arisen about this practice of releasing fluorocarbon-based refrigerants into the atmosphere. The release of such fluorocarbons is believed to deplete the concentration of ozone in the atmosphere. This ozone depletion is believed to adversely affect the environment and human health.

To avoid releasing these fluorocarbons into the atmosphere, devices have been constructed that are designed to recover the refrigerant from the refrigeration system. An example of such a refrigerant recovery device is shown in the applicants' U.S. Pat. No. 4,942,741 of Jul. 24, 1990, entitled Refrigerant recovery device. Examples of other devices are shown in Koser U.S. Pat. No. 4,285,206; Staggs et al., U.S. Pat. No. 4,539,817; Lower et al., U.S. Pat. No. 4,364,236; Lower et al., U.S. Pat. No. 4,441,330; Goddard U.S. Pat. No. 4,476,668; Manz et al., U.S. Pat. No. 4,768,347; and Cain, U.S. Pat. No. 4,261,178.

Some of the devices described above are used solely to recover refrigerants from the mechanical refrigeration system. Others of the devices, such as the device shown in the Applicants' 741 patent are designed both to recover refrigerant from a mechanical refrigeration system, and to process that refrigerant to remove contaminants from the refrigerant.

One difficulty encountered with the removal of refrigerant from a refrigeration system is the time required to remove the refrigerant. Although removal time is not that critical when servicing a relatively small volume refrigeration system, such as the air conditioning system in a car, or a room air conditioning system, the time required to remove refrigerant from a large system can be substantial. Examples of larger mechanical refrigeration systems include commercial freezers and refrigerators, and air conditioning systems used in commercial, industrial and office buildings.

Mechanical refrigeration systems typically have a high pressure port and a low pressure port through which refrigerant can be introduced to, or removed from the system. The refrigerant in the area of the system adjacent to the high pressure port of the refrigeration system is typically in liquid form. The refrigerant adjacent to the low pressure port of the refrigeration system is typically in a gaseous state.

Most refrigerant purge systems remove the refrigerant from the refrigeration system by evacuating the refrigerant in a gaseous form from the low pressure port of the mechanical refrigeration system. It has been found by applicants that the time required to remove refrigerant from a refrigeration system is decreased substantially if the refrigerant is recovered from the system as liquid refrigerant, by removing refrigerant through the high pressure port of the mechanical refrigeration system.

Several difficulties exist with the removal of liquid refrigerant from a refrigeration system. One difficulty is that a compressor cannot be used to draw liquid refrigerant out of the system directly, by placing the compressor in the conduit between the mechanical refrigeration system and a storage tank. The flow of liquid refrigerant through a compressor will likely damage or destroy the compressor.

Another difficulty is that to remove the liquid refrigerant efficiently, pressure should be maintained on the liquid refrigerant to maintain the liquid refrigerant in a liquid state as it moves from a mechanical refrigeration system into the storage tank. If the liquid refrigerant is allowed to expand into its gaseous form, much of the time efficiencies gained by removal of the refrigerant as liquid refrigerant is lost.

It is therefore one object of the present invention to provide a device that helps to overcome these problems by an enabling a substantial portion of refrigerant in a mechanical refrigeration system to be removed in a liquid state refrigerant rather than in a gaseous state.

SUMMARY OF THE INVENTION

In accordance with the present invention, a recovery device is provided for recovering refrigerant from a mechanical refrigeration system having a high pressure port through which refrigerant can be withdrawn from the system, and a low pressure port through which refrigerant can be withdrawn from the system. The recovering device comprises a refrigerant storage tank having a first entry port and a second entry port. A first refrigeration conduit extends between the high pressure port of the mechanical refrigeration system and the first entry port of the refrigerant storage tank. A second refrigerant conduit extends between the low pressure port of the mechanical refrigeration system and the second entry port of the refrigerant storage tank. A selectively actuable first flow control means is disposed in the second refrigerant conduit for controlling the flow of refrigerant from the refrigerant storage tank into the mechanical refrigeration system when the device is in a liquid refrigerant recovery mode of operation, and to permit the refrigerant to flow from the mechanical refrigeration system into the refrigerant storage tank when the device is in a gaseous refrigerant recovery mode of operation.

Preferably, the second flow control means includes a primary flow conduit, a compressor disposed in the primary flow conduit, a first by-pass switch, a first by-pass conduit in fluid communication with the first by-pass switch, a second by-pass switch, and a second by-pass conduit in fluid communication with the second by-pass switch. Additionally, the first and second by-pass switches are preferably movable between a first position, a second position and third position. In the first position, refrigerant is prevented from flowing between the refrigerant storage tank and a low pressure port of the mechanical refrigeration system. In the second position, the refrigerant is permitted to flow from the refrigerant storage tank, through the primary flow conduit and through the compressor, and into the low pressure port of the mechanical refrigeration system when the device is in the liquid refrigerant recovery mode of operation. In the third position, the refrigerant is permitted to flow from the low pressure port of the mechanical refrigeration system, into the first by-pass conduit, through the primary flow conduit and compressor, through the second by-pass conduit, and into the refrigeration storage tank.

One feature of the present invention is that means are provided to permit the introduction of gaseous refrigerant into a mechanical refrigeration system during the removal of liquid refrigerant. This feature has the advantage of helping to force the liquid refrigerant out of the mechanical refrigeration system during the recovery operation. By helping to force the liquid refrigerant out of the mechanical refrigeration system, a greater percentage of the refrigerant is recovered from the mechanical refrigeration system in a liquid state. The removal of a greater percentage of the refrigerant in a liquid state reduces the time required to purge the system.

Another feature of the present invention is that a flow control means is provided that can direct the flow of refrigerant in the recovery device in a single direction through a compressor, both when the refrigerant is flowing from the mechanical refrigeration system to the storage tank, and also when the refrigerant is flowing from the storage tank into the mechanical refrigeration system. This feature has the advantage of enabling a single compressor both to draw refrigerant from a tank for introducing refrigerant into the mechanical refrigeration system to promote the evacuation of liquid refrigerant from the system, and also to draw gaseous refrigerant from the mechanical refrigeration system during that portion of the device's cycle wherein gaseous refrigerant is being recovered from the system.

Additional features and advantages of the present invention will become apparent to those skilled in the art upon consideration of the following detailed description of a preferred embodiment exemplifying the best mode of carrying out the invention as perceived presently.

BRIEF DESCRIPTION OF THE DRAWINGS

FIG. 2 is a schematic view of the device of the present invention;

FIG. 3 is a partial, schematic view of the flow control means of the present invention;

DETAILED DESCRIPTION OF PREFERRED EMBODIMENTS

Figure 1:
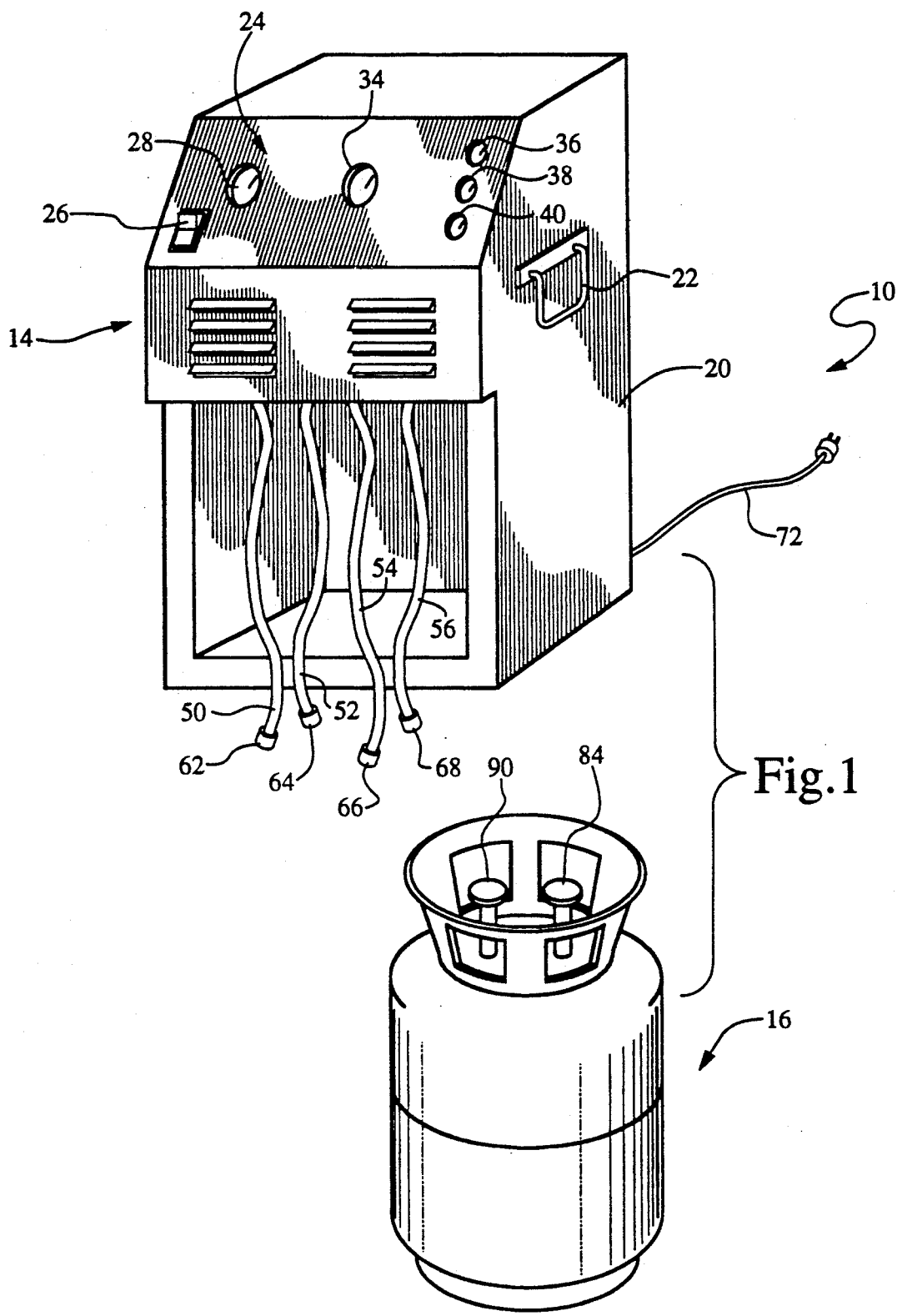
FIG. 1 is a perspective view of the refrigerant recovery device of the present invention.

Refrigerant recovery system 10 is shown in FIG. 1 for recovering refrigerant from a mechanical refrigeration system, such as a mechanical refrigeration system used in an air conditioning system for a house or vehicle, or in a refrigeration system, or heat pump system. The refrigerant recovery system 10 includes two primary components, a refrigerant recovery device 14, and a storage tank 16.

The refrigerant recovery device 14 includes a frame/cabinet 20 for housing all of the various components of the refrigerant recovery device 14. A pair of handles 22 are pivotably coupled to the side of the cabinet 20, to enable the user to carry the device 14 to the mechanical refrigeration system from which refrigerant is to be recovered.

The cabinet 20 also includes a front control panel 24 to which a three position switch 26 is mounted. Three position switch 26 includes a first or "liquid recovery mode" position, a second or "off" position, and a third or "vapor recovery mode" position.

A liquid sight glass 28 is also disposed on the front control panel 24. Liquid sight glass 28 is of conventional construction, and is provided for enabling the user to determine whether any liquid refrigerant is passing through the device 14, and hence being recovered from the mechanical refrigeration system.

A system pressure gauge 34 of conventional construction is disposed on the front control panel 24, to indicate the pressure of the refrigerant in the mechanical refrigeration system. Three lights 36, 38 and 40 are also placed on the control panel. First operating light 36 is provided to be lit when the device 14 is in operation, either in the vapor recovery mode, or the liquid recovery mode. Tank full light 38 is coupled to a level indicator in the storage tank 16 to be off in normal operation, but to be lit when the level of refrigerant in storage tank 16 has reached a level wherein the tank 16 is 80% full. High pressure light 40 is normally off during operation of the device 14, but is set to light up if an overpressure situation is detected in the mechanical refrigeration system.

Four refrigerant conduit segments extend from the device 14, for conducting refrigerant between the mechanical refrigeration system and the device 14, and between the refrigerant storage tank 16 and the device 14. The four refrigerant conduits segments include a low pressure side first conduit segment 50, a low pressure side second conduit segment 52, a high pressure side first conduit segment 54, and a high pressure side second conduit segment 56. Each of the four refrigerant conduit segments 50, 52, 54, 56 includes a quick connect coupling 62, 64, 66, 68, respectively, at their ends to enable the respective conduit segments to be coupled, as appropriate, to respective entry and exit ports of the mechanical refrigeration system 100 and the storage tank 16.

A power cord 72 provides a connection to a power source to operate the refrigeration device 14. Also, means (not shown) can be provided for coupling the device 14 to means for sensing the level of fluid in the storage tank 16.

The storage tank 16 is of conventional design. Generally, the refrigerant storage tank 16 resembles a propane storage tank of the type commonly used with outdoor barbecue grills. The storage tank 16 includes a first entry port 84 having a user actuable valve 86 for controlling the movement of fluid through the first entry port 84. The first entry port 84 can be coupled to the high side, second refrigerant conduit segment 56, to selectively permit liquidified refrigerant to be transported between the refrigerant recovery device 14 and the storage tank 16. The storage tank 16 also includes a second entry port 90, which can be coupled to the low side, second conduit segment 52, to enable gaseous refrigerant to be transported between the refrigerant recovery device 14 and the storage tank 16.

The components and operation of the refrigerant recovery system 10 are best explained with reference to FIG. 2.

As stated above, the device 14 is provided for recovering refrigerant from a mechanical refrigeration system 100. As will be appreciated, most mechanical refrigeration systems using fluorocarbon based refrigerants operate on generally similar principles, and contain generally similar components.

A typical mechanical refrigeration system 100 comprises a closed loop system having four primary components. These four primary components are a compressor 104, a condenser 106, an expansion valve 108 and an evaporator 110. In operation, a fluorocarbon refrigerant flows through the closed loop system. The refrigerant is compressed from a low pressure gaseous state to a high pressure gaseous state by compressor 104. Refrigerant leaves the compressor, and flows into the condenser 106. The condenser 106 serves as a heat exchanger, and is functionally similar to an automobile radiator. A fan 111 draws air through the condenser 106 to remove heat from the condenser 106, to thereby facilitate the condensation of the compressed vapor into a cooled, liquified refrigerant. The cooled, liquified refrigerant then flows through expansion valve 108. Expansion valve 108 regulates the flow of refrigerant into the evaporator 110. In the evaporation, the refrigerant expands into its gaseous state, absorbing heat in the process.

The refrigerant then passes through evaporator 110. Evaporator 110 serves also primarily as a heat exchanger, and may have a construction similar to or identical to condenser 106. A fan 112 draws air through evaporator 110. The contact of the air and the evaporator 110 cools the air. This cooled air can then be transported by appropriate ducts into the space to be cooled, such as the interior of the building, house, or refrigerator to be cooled.

A heat pump system works similarly to a standard mechanical refrigeration system 100, and is configured similarly to a standard mechanical refrigeration system 100. The primary difference between a heat pump and a standard mechanical refrigeration system is that a heat pump includes means to reverse the flow of refrigerant in the system, so that during a heating cycle, the heat exchanger that serves as a condenser during an air conditioning cycle serves as an evaporator during a heating cycle; and the heat exchanger that serves as an evaporator during an air conditioning cycle serves as a condenser during a heating cycle.

Most mechanical refrigeration systems include a high pressure port 114 disposed downstream from the compressor 104, and a low pressure port 116 disposed upstream from the compressor 104. Refrigerant can be introduced into, and removed from the mechanical refrigeration system 100 through the high pressure port 114 and low pressure port 116. The high pressure port 116 typically includes a coupling member 115 to which a line can be coupled to introduce refrigerant to, or remove refrigerant from the high pressure port 114. Low pressure port 116 also includes a similar coupling member 117.

The refrigerant recovery device 14 includes a first refrigerant conduit 124 that extends between the high pressure port 114 of the mechanical refrigeration system 100, and the first entry port 84 of the storage tank 16. The first refrigerant conduit 124 includes first high pressure side conduit segment 54, which extends between the refrigerant recovery device 14 and the high pressure port 114, and second high pressure conduit segment 56 which extends between the refrigerant recovery device 14 and the storage tank 16. The quick connect couplings 66, 68 of the high pressure side first and second conduit segments 54, 56, are configured to be coupled to the coupling member 115 of the high pressure port 114 of the mechanical refrigeration system 100, and the coupling member 117 of the first entry port 84 of the storage tank 16, respectively.

The first refrigerant conduit 124 also includes an intra-device conduit segment 130 that is contained primarily within the refrigerant recovery device 14. The intra-device conduit segment 130 includes the liquid sight glass 28, and a check valve 138.

As explained above, the liquid sight glass 28 comprises, in essence, a clear portion of the intra-device conduit segment 130. By viewing the sight glass 28, the operator can determine whether liquified refrigerant is flowing through the first refrigerant conduit 124.

The check valve 138 blocks the flow of refrigerant from the storage tank 16 to the mechanical refrigeration system 100. Check valve 138 only permits the flow of liquid refrigerant from the mechanical refrigeration system 100 to the storage tank 16.

Storage tank 16 includes a liquid entry tube 142, through which liquid refrigerant flowing from high pressure side second conduit segment 56, can pass when liquid is flowing into storage tank 16. The terminus 144 of tube 142 is disposed near the bottom of the interior 145 of the tank 16 to be normally below the level of liquid refrigerant in the interior 145 of the tank 16.

The device 14 also includes a second refrigerant conduit 150 that extends between the low pressure port 116 of the mechanical refrigeration system 100, and the second entry port 90 of the storage tank 16. Second refrigerant conduit 150 includes low pressure side first conduit segment 50, and low pressure side second conduit segment 52.

The second refrigerant conduit 150 includes a primary flow conduit 162 that, for purposes of this description is defined to include that portion of second refrigerant conduit 150 between first by-pass switch 168 and second by-pass switch 174.

A selectively actuable flow control means 156 is disposed in the second refrigerant conduit 150 for controlling the flow of gaseous refrigerant between the mechanical refrigeration system 100 and the refrigerant storage tank 16. The selectively actuable control means 156 includes a plurality of components and flow paths.

The components of the selectively actuable flow control means 156 include a first by-pass switch 168, a compressor 172, a second by-pass switch 174, a high pressure sensor and switch 178 and a low pressure sensor and switch 180. First by-pass switch 168, compressor 172 and second by-pass switch 174 are all disposed in the primary flow conduit 162 of the device 14 to enable refrigerant to flow through the above-referenced components.

The high pressure sensor switch 178 and low pressure sensor and switch 180 are operatively coupled to the primary flow conduit 162 to take appropriate pressure readings in the primary flow conduit 162. The selectively actuable flow control means 156 also includes a first by-pass conduit 170 having a first terminus 184 disposed at the first by-pass switch 168, and a second terminus 186 disposed between the compressor 172 and the second by-pass switch 174. As will be explained in more detail below, the compressor 172 is configured to compress gas flowing therethrough in a direction indicated generally by arrow A. Thus, the second terminus 186 of the first by-pass conduit 170, is disposed upstream in the refrigerant flow path from the compressor 172. The second by-pass conduit 176 includes a first terminus 190 disposed at the second by-pass switch 174, and a second terminus 192 disposed between the compressor 172 and the first by-pass switch 184. As will be appreciated, second terminus 192 is disposed downstream in the refrigerant flow path from a compressor 172.

Figure 5:
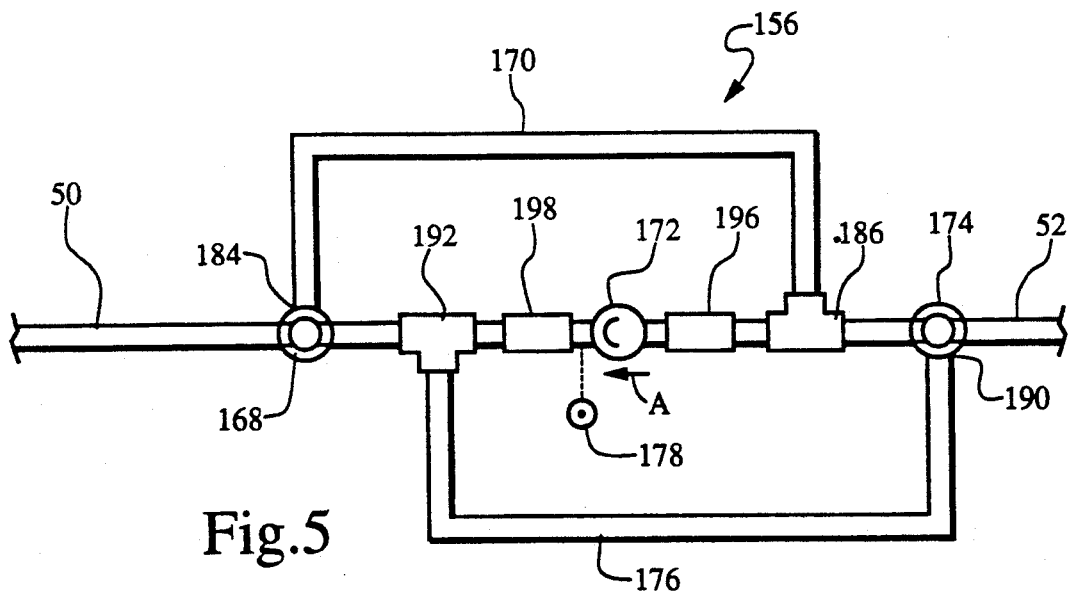
FIG. 5 is a schematic view of the flow control means of the present invention.

As best shown in FIG. 5, a filter/dryer 196 and oil separator 198 can also be disposed in the primary flow conduit 162. Preferably, filter/dryer 196 is disposed upstream from compressor 172, and downstream from the second terminus 186 of first by-pass conduit 170. Oil separator 198 is preferably disposed downstream from compressor 172, and upstream from the second terminus 192 of second by-pass conduit 176. The operation and function of the filter/dryer 196 and oil separator 198 will be appreciated by those skilled in the art. Several commercially acceptable filter/dryers and oil separators can be used in the device 14.

A gaseous entry tube 200 having a terminus 202 disposed adjacent to the upper portion of interior 145 of storage tank is provided for conducting gaseous refrigerant into and out of the interior 145 of storage tank 16.

Figure 4:
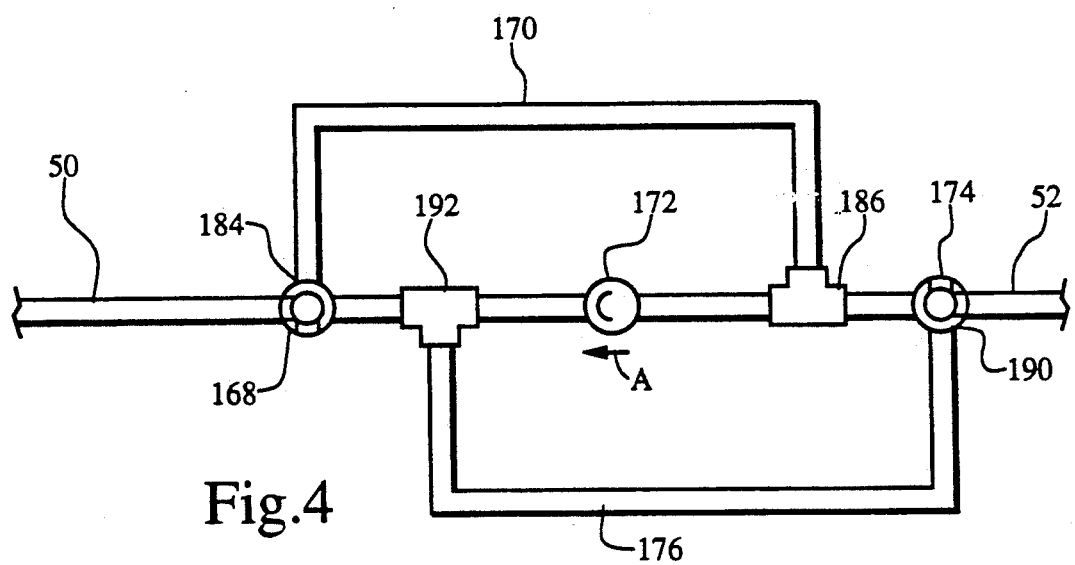
FIG. 4 is a schematic view of the flow control means of the present invention.

The first by-pass switch 168 and second by-pass switch 174 are preferably three position switches. Examples of switches that will perform in the refrigerant purging device 14 include No. 174 model valves manufactured by the Skinner Valve Corporation of New Britain Conn. The switches preferably comprise three-way valves movable between a first position (as shown in FIG. 4), a second position (as shown in FIG. 2), and third position (as shown in FIG. 3).

When the switches 168, 174 are in their first position, the switches 168, 174 are directed so as to prevent the flow of refrigerant between first conduit segment 54, and second conduit segment 52. When in the first position, no refrigerant can flow through the switches 168, 174, the by-pass conduits 170, 176 or compressor 172.

When in the second position, the switches 168, 174 are in an open position, to allow gaseous refrigerant to flow from second refrigerant conduit segment 52, through switch 174, through primary flow conduit 162 in the direction indicated generally by arrow A.

In the third position, the switches 168, 174 are configured so that gaseous refrigerant flows from first conduit segment 50, through by-pass switch 168, into first by-pass conduit 170, to the terminus 186 of first by-pass conduit 170. Refrigerant then flows through the compressor 172 in the direction indicated generally by arrow A, and into and through the second terminus 192 of second by-pass conduit 176. Refrigerant then flows through the second by-pass conduit 176, and through second by-pass switch 174. The refrigerant is then delivered into second conduit segment 52, and ultimately into the interior 145 of refrigerant storage tank 16.

The refrigerant recovery system 10 operates as follows:

The user first couples the refrigerant recovery device 14 to the storage tank 16. To accomplish this, the high side second conduit segment 56 is coupled to first entry port 84 of storage tank 16, by coupling quick connect coupling 68 of second conduit segment 56, to quick connect coupling 118 of first entry port 84. Additionally, quick connect coupling 64 of the low pressure side second conduit segment 52 is coupled to the quick connect coupling 210 of the second entry port 90 of tank 16.

The device 14 is then coupled to the mechanical refrigeration system 100 from which the refrigerant is to be recovered. This coupling occurs by attaching the quick connect coupling 66 of high pressure side first conduit segment 54 to the coupling member 115 on the high pressure side refrigerant port 114 of the mechanical refrigeration system 100. Similarly, the quick connect coupling 62 of the low pressure side first conduit segment 50 is coupled to the coupling member 117 of the low pressure port 116 of the mechanical refrigeration system 100.

After the recovery device 14 is coupled to the storage tank 16 and to the mechanical refrigeration system 100, the recovery of the refrigerant can commence. To commence recovery, the operator moves switch 26 into the "liquid recovery" position, to begin the liquid recovery mode of operation of the device 14. Switch 26 actuates the components within the refrigerant recovery device 14 to recover liquid refrigerant from the mechanical refrigeration system 100. Among the components actuated are first by-pass switch 168, second by-pass switch 174 and compressor 172. The absence of any valve (except check valve 130) allows liquid refrigerant to flow from the mechanical refrigeration system 100, through first refrigerant conduit 124, and into the interior 145 of tank 16. Check valve 138 prevents the back flow of refrigerant from refrigerant storage tank 16 to the mechanical refrigeration system 100.

Simultaneously, switches 168 and 174 are actuated to move from their first, or off position, as shown in FIG. 4, to their second or liquid recovery position as shown in FIG. 2. When in their liquid recovery position, the switches 168, 174 are positioned to permit gaseous refrigerant to flow from the interior 145 of tank 16, into the low side second conduit segment 52, through second by-pass switch 174, into primary flow conduit 162, through compressor 172, through first by-pass switch 168, and into the low side, first conduit segment 50. From refrigerant conduit segment 50, gaseous refrigerant is introduced into the low pressure port 116 of the mechanical refrigeration system 100.

Simultaneously with the movement of switches 168, 174 and solenoid valve 134, the compressor 172 is actuated. The actuation of compressor 172 helps to draw gaseous refrigerant from the interior 145 of the tank 16, to foster the introduction of this gaseous refrigerant, under pressure, into the mechanical refrigeration system 100.

In the liquid refrigerant recovery mode of operation of the device 14, two primary events are occurring. The first event is that liquid refrigerant is being withdrawn from the high side entry port 114 of the mechanical refrigeration system, and conducted to the interior 145 of the refrigeration storage tank 16. The second event is that gaseous refrigerant is being drawn from the interior 145 of the refrigerant storage tank 16 by the compressor 172, and being introduced into the mechanical refrigeration system 100 through the low pressure port 116 of the mechanical refrigeration system 100.

The introduction of the gaseous refrigerant into the mechanical refrigeration system 100 helps to foster the removal of liquid refrigerant from the mechanical refrigeration system 100 through the high pressure port 114. The gaseous refrigerant introduced into the mechanical refrigeration system 100 helps to maintain the liquid refrigerant within the mechanical refrigeration system 100 at a high pressure, to help reduce the likelihood that the liquid refrigerant within the system 100 will be converted into gaseous refrigerant. This helps to foster the removal of the liquid refrigerant as liquid refrigerant, rather than gaseous refrigerant. Additionally, the introduction of gaseous refrigerant into the mechanical refrigeration system 100 helps to increase the pressure inside the mechanical refrigeration system 100. This increase in pressure helps to force the liquid refrigerant out of high pressure port 114, and helps to prevent gaseous refrigerant from being purged from the mechanical refrigeration system 100 by leaving the mechanical refrigeration system through low pressure port 116.

During the liquid recovery mode of operation, the high pressure sensor and switch 178 helps to prevent the system from becoming over pressurized. If the high pressure sensor and switch 178 senses a pressure downstream from the compressor 172 of greater than 180 p.s.i.g., the high pressure sensor in switch 178 will shut down the compressor 172, to discourage the further introduction of gaseous refrigerant into the mechanical refrigeration system 100. Although the compressor 172 will be shut down, liquid refrigerant will continue to be recovered from the mechanical refrigeration system 100. This removal of the liquid refrigerant from the mechanical refrigeration system 100 helps to reduce the pressure within the mechanical refrigeration system 100.

When the pressure sensed by high pressure switch and sensor 178 exceeds 180 p.s.i., switch and sensor 178 also actuates high pressure light 40 to turn on, thereby indicating to the user that an overpressure situation exists within the mechanical refrigeration system 100.

Once the high pressure switch and sensor 178 senses that the pressure has decreased below 150 p.s.i.g., the high pressure sensor and switch 178 will reactivate the compressor 172 to allow further gaseous refrigeration system 100, and turn off high pressure light 40. This 30 p.s.i.g. differential between the compressor 172 shut off pressure and the compressor 172 reactivation pressure helps to increase the operational safety of the device by reducing the likelihood that an overpressure situation will exist in either the device 14 or the mechanical refrigeration system 100.

During the operation in the liquid recovery mode, the operator can peer through sight glass 28, to determine whether liquid refrigerant is still being recovered from the system. When the operator no longer sees liquid flowing through sight glass 28, the user can then cease operation of the device 14 in the liquid recovery mode, by actuating three position switch 26.

It is envisioned that the operation of the device 14 in the liquid recovery mode will not completely recover all refrigerant from the mechanical refrigeration system 100. Rather, it will be necessary to purge additional refrigerant through the purging of refrigerant in the gaseous recovery mode.

To operate the device in the gaseous recovery mode, the three position switch 26 is moved to the gaseous recovery mode position. The movement of switch 26 actuates the first and second by-pass switches 168, 174 to move to their third position as shown in FIG. 3, and turns on compressor 172 to draw refrigerant through the compressor 172 in the direction indicated generally by arrow A.

The placement of first by-pass switch 168 in its third position couples the low-pressure side first conduit segment 50 to the first by-pass conduit 170. The placement of second by-pass switch 174 in its third position couples the low-pressure side second conduit segment 52 to the second by-pass conduit 176. Through the action of compressor 172, gaseous refrigerant is drawn from the mechanical refrigeration system 100, and transported through second entry port 152 into the interior 145 of refrigerant storage tank 16.

When the switches 168, 174 are in their third positions, the refrigerant follows the below described path from the mechanical refrigeration system 100 to the refrigerant storage tank 16. The refrigerant flows out of low side entry port 116 into the low side first conduit segment 50. From low side first conduit segment 50, the refrigerant flows through first by-pass switch 168 and into the first by-pass conduit 170. The refrigerant then flows out of the second terminus 186 of first by-pass conduit 170, into the primary flow conduit 162, through compressor 172 in the direction indicated generally by arrow A, through the second terminus 192 of the second by-pass conduit 156, and into the second by-pass conduit 156. The refrigerant then exits the second by-pass conduit 156, flows through second by-pass switch 174, and is directed to the low side second conduit segment 52. The refrigerant then flows through the low side second conduit segment 52 and into the second entry port 90 and out of the terminus 202 of the gaseous entry tube 200, and ultimately is deposited in the interior 145 of the refrigerant storage tank 16.

The device 14 will continue to draw gaseous refrigerant from the mechanical refrigeration system 100 until either all of the refrigerant is substantially removed from the mechanical refrigeration system 100 or the storage tank 16 becomes full. Low-pressure sensor and switch 180 senses the pressure in the mechanical refrigeration system 100. If the pressure in the mechanical refrigeration system 100 sinks below 5 p.s.i.g., the low pressure sensor and switch 180 will determine that the refrigerant has been substantially removed from the mechanical refrigeration system 100 and will shut down the system. Alternately, if the liquid level detection means determines that the storage tank 16 is full, it will send a signal to the refrigerant recovery device 14 through conduit 74, to shut down the refrigerant recovery device 14.

Figure 6:
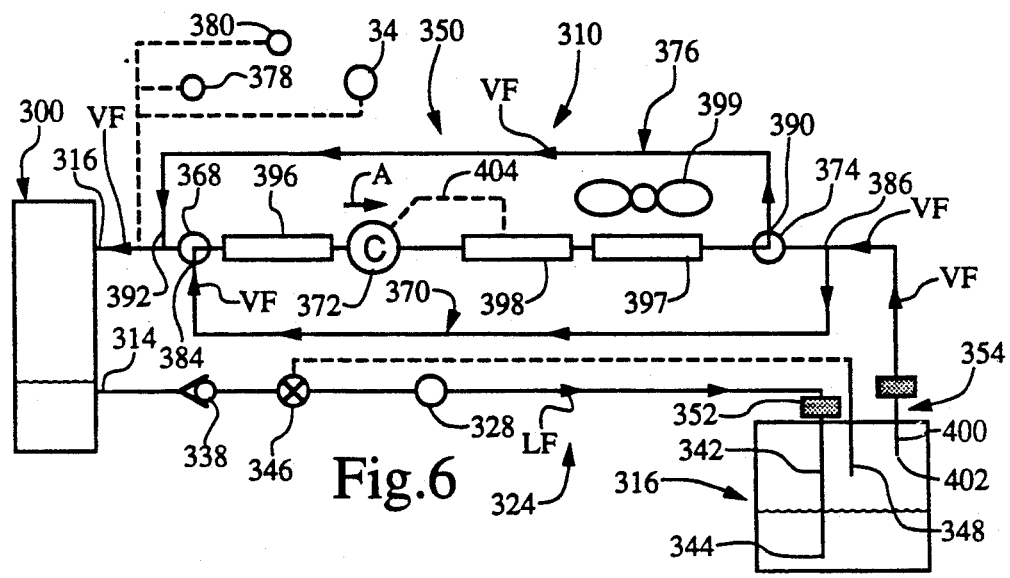
FIG. 6 is a schematic view of an alternate embodiment of the present invention in its "liquid recovery" mode of operation.

An alternate embodiment of the present invention is shown in FIG. 6. The invention of FIG. 6 is generally similar to the embodiments of FIGS. 1-5 discussed above. However, the embodiments of FIGS. 6-8 differ from the embodiments of FIGS. 1-5 in the relative placement of the by-pass switches and T-connectors (second term termini) for the by-pass conduits. The embodiments shown in FIGS. 1-5 have the T-connectors 186, 192 mounted relatively "inboard," and toward the compressor 172, and the by-pass switches 168, 174 mounted relatively "outboard" and away from the compressor 172. To the contrary, the embodiments shown in FIGS. 6-8 have the T-connectors mounted "outboard" and the by-pass switches mounted "inboard" relative to the compressor 372.

Figure 7:
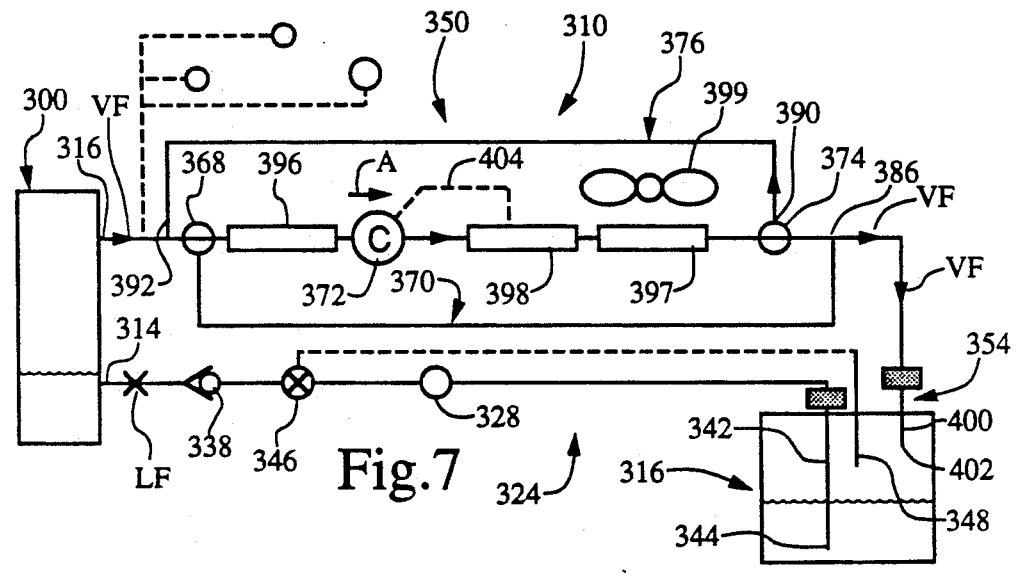
FIG. 7 is a schematic view of the embodiment of FIG. 6 shown in the "vapor recovery" mode of operation.
Figure 8:
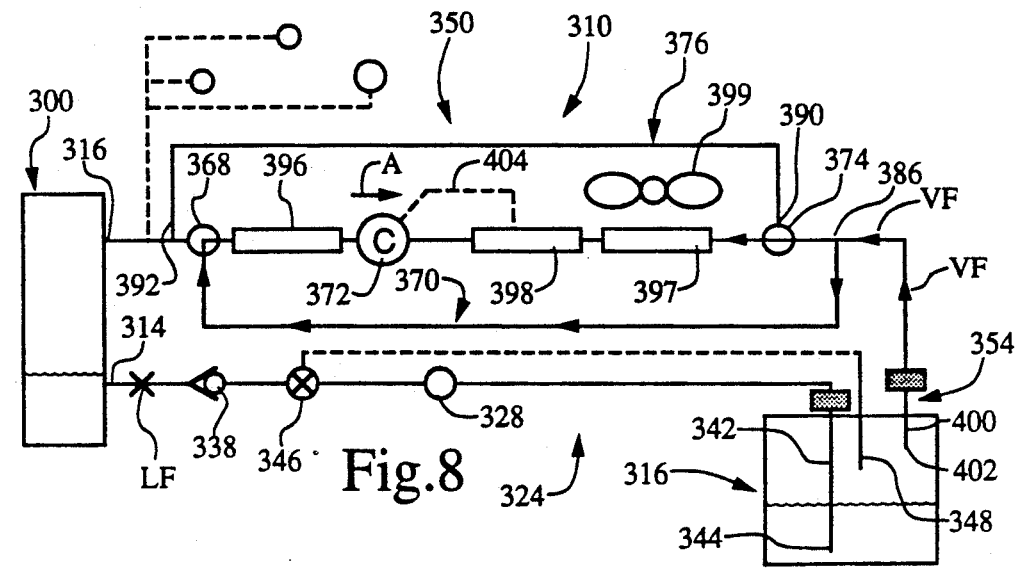
FIG. 8 is a schematic view of the embodiment of FIG. 6 shown in its "off" mode of operation.

The primary advantage obtained through the configuration shown in FIGS. 6-8 is that when the device 310 is turned off, the compressor 372 will be in a relatively balanced condition, such that the pressure on the upstream side of the compressor 372 is generally equal to the pressure on the downstream side of the compressor. The applicants have found that such an arrangement facilitates the start up of the compressor 372 in subsequent cycles.

Turning now to FIGS. 6-8, and FIG. 6 in particular, a refrigeration system 300, although illustrated differently, is generally similar in configuration and operation to mechanical refrigeration system 100 shown in FIG. 3. Mechanical refrigeration system 300 includes a high pressure port 314 and a low pressure port 316, the positioning and function of which are identical to that of mechanical refrigeration system 100. Refrigerant can be introduced into, and removed from the mechanical refrigeration system 300 through the high pressure port 314 and low pressure port 316. Coupling members (not shown) are provided for attaching conduit segments to the high pressure port 116 and low pressure port 114.

The alternate embodiment refrigerant recovery system 310 includes a first refrigerant conduit 324 that extends between the high pressure port 314 of the mechanical refrigeration system 100, and the first entry port 352 of the refrigerant storage tank 316. The first refrigerant conduit 124 can include first and second high pressure conduit segments (not shown) which extend between the refrigeration system to be serviced at 300 and the refrigerant recovery device 310; and between the refrigerant recovery device 310 and the storage tank 316, respectively. Quick connect couplings (not shown) can be provided to couple the various conduits to the mechanical refrigeration system 300 and storage tank 316.

The first refrigerant conduit 324 also includes a liquid sight glass 328, a check valve 338, and a solenoid valve 346. The liquid sight glass 328 comprises, in essence, a clear portion of the refrigerant conduit 324. By viewing the sight glass 328, the operator can determine whether liquified refrigerant is flowing through the first refrigerant conduit 324.

The check valve 338 blocks the flow of refrigerant from the storage tank 316 to the mechanical refrigeration system 300. Check valve 338 only permits the flow of liquid refrigerant in a single direction from the mechanical refrigeration system 300 to the storage tank 316, and not in the opposite direction.

Solenoid valve 346 is operatively coupled to a liquid level detector 348 disposed in the interior of tank 316. Solenoid valve 346 is coupled to the liquid level detector 348 to prevent the flow of refrigerant through the first refrigerant conduit 324 when the liquid level detector 348 detects a "tank full" condition. Preferably, the liquid level detector comprises a thermistor-type liquid level detector such as that disclosed in White & Hancock U.S. patent application Ser. No. 07/725,834 which was filed on Jul. 3, 1991, and is assigned to K-Whit Tools, Inc. the assignee of the instant invention. The disclosure of the device in this White & Hancock application is hereby incorporated by reference into this application.

The storage tank 316 includes a liquid entry tube 342, through which liquid refrigerant flowing from the first refrigerant conduit 324 can pass when liquid refrigerant is flowing into the storage tank 316. Terminus 344 is disposed near the bottom of the interior of the tank 316 to be normally below the level of liquid refrigerant in the interior of storage tank 316.

The refrigerant recovery device 310 also includes a second refrigerant conduit 350 that extends between the low pressure port 316 of the mechanical refrigeration system 300, and the second entry port 354 of the storage tank 316. The second refrigerant conduit 350 further includes low pressure first and second conduit segments (not shown). The second refrigerant conduit 350 also includes a primary flow conduit that, for purposes of this description, is defined to include that portion of the second refrigerant conduit 350 between the T-connector 392 which comprises the second terminus of the second by-pass conduit 376, and the T-connector 386 which comprises the second terminus of the first by-pass conduit 370.

The selectively actuable flow control means is disposed in the second refrigerant conduit 350 for controlling the flow of gaseous refrigerant between the mechanical refrigeration system 300 and the refrigerant storage tank 316, and includes a plurality of components. The components of the selectively actuable flow control means include a first by-pass switch 368, a compressor 372, a second by-pass switch 374, a high pressure sensor and switch 378, and a low pressure sensor and switch 180. First by-pass switch 368, compressor 372 and a second by-pass switch 374 are all disposed in the primary flow conduit portion of the second refrigerant conduit 324 to enable refrigerant to flow through the above referenced components.

In addition to the components discussed above, the second refrigerant flow path 350 also includes a filter/dryer 396, an oil separator 398, a condenser 397 and a fan 399 disposed adjacent to the condenser 397. The filter/dryer 396 is provided for removing particulate matter and other contaminates from refrigerant flowing through the filter/dryer 396. The oil separator 398 is disposed down stream from the compressor 372, and is provided for separating oil from refrigerant which flows out of the compressor 372. An oil return line 404 is provided for returning the separated oil back to the compressor 372. Turning now to compressor 372, it will be noted that the compressor 372 generally only operates in "one direction" as designated by arrow A. The condenser 397 and fan 399 are provided for removing heat from refrigerant compressed by the compressor 372. Preferably, condenser 397 comprises a capillary tube type arrangement.

The selectively actuable flow control means also includes a first by-pass conduit with 370 having its first terminus 384 disposed at the first by-pass switch 368, and its second terminus at T-connector 368. The T-connector type second terminus 386 of the first by-pass conduit 370 is disposed outboard from the second by-pass switch 374. The first terminus 384 of the first by-pass conduit 370, and first by-pass switch as 368 are disposed inboard of the second terminus T-connector 392 of the second by-pass conduit 376.

The second by-pass conduit 376 includes a first terminus 390 disposed at the second by-pass switch 374, and a second terminus T-connector 392 disposed outboard of the first by-pass switch 368. The second by-pass switch 374 is disposed inboard of the second terminus T-connector 386 of the first by-pass conduit.

A gaseous entry tube 400 having a terminus 402 disposed adjacent to the upper portion of the interior of the storage tank 316 is provided for conducting gaseous refrigerant into and out of the interior of the storage tank 316.

The by-pass switches 368, 374 can be reversing valve type by-pass switches. An example of a reversing valve which will function in the device 314 of the present invention is available as K-Whit part number 60055 reversing valve assembly, which is available from K-Whit Tools, Inc., the assignee of the instant application.

Similar to the device 314 shown in FIGS. 1-5, the by-pass switches 368, 374 of device 310 have three modes of operation. The first mode of operation is a liquid recovery mode of operation; the second mode is a vapor recovery mode of operation; and the third mode is a gaseous recovery mode of operation.

The alternate embodiment device 310 shown in FIGS. 6-8 operates as follows. Turning first to FIG. 6, the device is shown in its liquid recovery mode of operation.

In the liquid refrigerant recovery mode of operation of the device 314, two primary events are occurring. The first event is that liquid refrigerant is being withdrawn from the high pressure side entry port 314 of the mechanical refrigeration system 300, and conducted to the interior of the refrigerant storage tank 316. The second event is the gaseous refrigerant is being withdrawn from the interior of the refrigerant storage tank 316 by the compressor 172 and being introduced into the mechanical refrigeration system 300 through the low pressure port 316 of the mechanical refrigeration system 300. The introduction of the gaseous refrigerant into the mechanical refrigeration system 300 helps to foster the removal of liquid refrigerant from the mechanical refrigeration system 300 through the high pressure port 314. In terms of overall strategy of operation, the alternate embodiment shown in FIGS. 6-8 employs the same strategy as the embodiment of the device 14 shown in FIGS. 1-5. In this regard, the operations of the high and low pressure switches 378, 380, liquid sight glass 328 and compressor 372 are identical to their counterparts in the device 14 shown in FIGS. 1-5.

During operation in the liquid recovery mode, the device 314 actuates the first by-pass switch 368 and second by-pass switch 374 to be placed in their positions shown in FIG. 6, and solenoid valve 346 is caused to become opened. Through this arrangement, liquid refrigerant can flow from the high pressure port 314 through check valve 338 and solenoid 346, through sight glass 328, and through the first entry port 352 of the refrigerant storage tank 316. Liquid refrigerant then flows through liquid entry tube 342, out of terminus 344 and is deposited into the interior of the refrigerant storage tank 316. In FIG. 6, the direction of flow of the liquid refrigerant is indicated by arrows LF.

To aid in this process, gaseous refrigerant is introduced into the low pressure port 316, to foster the removal of liquid refrigerant from the high pressure port 314. The first and second by-pass switches 368 are placed in the positions shown in FIG. 6, and the compressor 372 is actuated. The direction of flow in the second refrigerant conduit 350 is indicated by arrows VF. Gaseous refrigerant is withdrawn from the refrigerant storage tank 316. Because of the positioning of second by-pass switch 374, the refrigerant then flows through the T-connector terminus 386 of the first by-pass conduit 370, and into the first by-pass conduit 370. The refrigerant flows in the first by-pass conduit 370 until it enters into the first by-pass switch 368. The first by-pass switch 368 is positioned to cause refrigerant to be conducted from the first by-pass conduit 370 into the filter/dryer 396 and then into compressor 372.

The pressurized refrigerant is then passed through the oil separator 398 and condenser 397 and enters the second by-pass switch 374. The positioning of second by-pass switch 374 shuttles the refrigerant into the second by-pass conduit 376, where it flows between the first terminus 390 of the second by-pass conduit 376 and the second terminus T-connector 392 of the second by-pass conduit 376. The refrigerant then passes through the low pressure entry port 316 into the mechanical refrigeration system 300 to increase the pressure within the mechanical refrigeration system 300. This increased pressure helps to force liquid refrigerant out of the high pressure port 314, through first refrigerant conduit 324, and into tank 316.

When substantially all of the liquid refrigerant that can be recovered from the system has been recovered, the liquid recovery phase is completed. The user can then switch the device 310 over to its gaseous refrigerant recovery mode. Should the tank level sensor 348 detect that the refrigerant storage tank 316 is full, the electronic componentry (not shown) within the device 314 will cause the solenoid valve 346 to close, thus preventing any further liquid refrigerant from entering into the tank 316. Additionally, the liquid level detector 348 can be coupled to the electronic circuitry of the device 314 to cause the compressor 372 to shut down.

The gaseous recovery mode of operation will be described in conjunction with FIG. 7.

In the gaseous recovery mode, the first and second by-pass switches 368 are placed in the position in FIG. 7 to allow a "straight line" flow of refrigerant from the mechanical refrigeration system 300 into the storage tank 316. Although refrigerant can flow through the first and second by-pass conduits 370, 376 because of the nature of the T-connector termini 386, 392 the first and second by-pass conduits 370, 376 represent "dead ends" in the refrigerant flow path due to the fact that the by-pass switches 368, 374 block the refrigerant from flowing through the by-pass switches 368, 374.

The path taken by the gaseous refrigerant is indicated generally by arrows VF. It will be noted that liquid refrigerant is not permitted to flow through the first refrigerant conduit 324.

During the gaseous refrigerant recoverant mode of operation, the compressor 372 is actuated to pull gaseous refrigerant out of the low pressure port 316 of the mechanical refrigeration system 300. The refrigerant passes through the first by-pass switch 368 which shuttles the refrigerant directly to the filter/dryer 396, and then into compressor 372. Pressurized refrigerant which exits the compressor 372 then flows through the oil separator 398, and condenser 397. After leaving condenser 397, the refrigerant passes through the second by-pass switch 374, which shuttles the refrigerant to the second entry port 354 of the tank, through the vapor entry tube 400, and into the upper regions of the refrigerant storage tank 316.

The operation of the device 314 in its "off position" will now be described with reference to FIG. 8. In FIG. 8, the positioning of the first and second by-pass switches 368, 374 allows the refrigerant to flow equally on both the upstream and downstream side of the compressor 372 to create a situation wherein the pressure is balanced on the upstream and downstream sides of the compressor 372. The direction of flow of the vaporous refrigerant is indicated by arrows VF. Even if the second entry port 354 of the refrigerant storage tank 316 is closed so as to prevent to flow of refrigerant from the tank 316, it will be appreciated that the second refrigerant conduit 350 will still likely contain some refrigerant under pressure.

The second terminus T-connector 386 of the first by-pass conduit 370 allows refrigerant to flow both in the first by-pass conduit 370, and to flow also toward second by-pass switch 374. Refrigerant which flows in the first by-pass conduit 370 will flow toward and through the first by-pass switch 368. The first by-pass switch 368 shuttles refrigerant from the first by-pass conduit 370 into the filter dryer 396, and then to compressor 372. As the compressor 372 is not operating during the "off" mode of operation of the device 310, the compressor 372 is not acting to pull refrigerant through the compressor 372. However, pressure of the refrigerant will cause it to flow through the first by-pass conduit 370, through first by-pass switch 368, and through filter/dryer 396 to pressurize the upstream side of the compressor 372. Simultaneously, the positioning of second by-pass switch 374 allows refrigerant to flow through the second by-pass switch 374, backward through the condenser 397, and the oil separator 398, to the downstream side of the compressor 372.

Over time, this free flow between the upstream and the downstream sides of the compressor 372 will cause the pressure on the upstream and downstream side of the compressor 372 to equalize, thus creating a balanced pressure situation. It has been found by applicants that this balanced pressure situation is especially advantageous for enabling the compressor 372 to begin operation in a subsequent cycle. It should also be noted that the position of second by-pass switch 374 prevents the entry of refrigerant into the second by-pass conduit 376. This positioning prevents refrigerant from flowing back into the mechanical refrigeration system 300. Additionally, it should be noted that liquified refrigerant is not allowed to flow through the first refrigerant conduit 324.

Submitted with this application is an appendix comprising the operations manual of the White Industries (a division of K-Whit Tools, Inc.) 01620 device. The additional descriptions contained within this operations manual are hereby incorporated by reference into this application.

Having described the invention detail and by reference to the preferred embodiments thereof, it will be apparent that modifications and variations are possible without departing from the scope of the invention as defined in the appended claims.

What is claimed is:

1. A device for recovering refrigerant from a mechanical refrigeration system having a high pressure port through which refrigerant can be withdrawn from the system, and a low pressure port through which refrigerant can be withdrawn from the system, the recovery device comprising:
   (a) a refrigerant storage tank having a first entry port and a second entry port,
   (b) a first refrigerant conduit extending between the high pressure port of the mechanical refrigeration system and the first entry port of the refrigerant storage tank,
   (c) a second refrigerant conduit extending between the low pressure port of the mechanical refrigeration system and the second entry port of the refrigerant storage tank, and
   (d) a selectively actuable first flow control means disposed in the second refrigerant conduit, for controlling the flow of refrigerant from the refrigerant storage tank into the mechanical refrigeration system when the device is in a liquid refrigerant recovery mode of operation, and to permit the refrigerant to flow from the mechanical refrigeration system into the refrigerant storage tank when the device is in a gaseous refrigerant recovery mode of operation.

2. The recovery device of claim 1 wherein the first flow control means includes a compressor means operable both in the liquid refrigerant recovery mode and the gaseous refrigerant recovery mode.

3. The recovery device of claim 2 wherein the first flow control means includes
   a primary flow conduit,
   a first by-pass switch,
   a first by-pass conduit in fluid communication with the first by-pass switch,
   a second by-pass switch, and
   a second by-pass conduit in fluid communication with the second by-pass switch.

4. The recovery device of claim 3 wherein
   the first by-pass switch and the second by-pass switch are disposed in the primary flow conduit, and
   the compressor is disposed in the primary flow conduit between the first by-pass switch and the second by-pass switch.

5. The recovery device of claim 4 wherein
   the first by-pass conduit includes a first terminus disposed at the first by-pass switch, and a second terminus disposed at the primary flow conduit between the compressor and the second by-pass switch, and
   the second by-pass conduit includes a first terminus disposed at the second by-pass switch, and a second terminus disposed at the primary flow conduit between the compressor and the first by-pass switch.

6. The recovery device of claim 5 wherein the second refrigerant conduit includes
   a first conduit segment coupled to the first by-pass switch and attachable to the low pressure port of the mechanical refrigeration system, and
   a second conduit segment coupled to the second by-pass switch and attachable to the refrigerant storage tank.

7. The recovery device of claim 6 wherein the first by-pass switch is movable between
   a first position wherein refrigerant is prevented from flowing between the first conduit segment and either of the primary flow conduit or the first by-pass conduit,
a second position wherein refrigerant can flow between the first conduit segment and the primary flow conduit when the device is the liquid refrigerant recovery mode of operation, and
a third position wherein refrigerant can flow between the first conduit segment and the first by-pass conduit when the device is in the gaseous refrigerant recovery mode of operation.

8. The recovery device of claim 6 wherein the second by-pass switch is movable between
a first position wherein refrigerant is prevented from flowing between the second conduit segment and either of the primary flow conduit or the second by-pass conduit,
a second position wherein refrigerant can flow between the second conduit segment and the primary flow conduit when the device is in the liquid refrigerant recovery mode of operation, and
a third position wherein refrigerant can flow between the second conduit segment and the second by-pass conduit when the device is in the gaseous refrigerant recovery mode of operation.

9. The recovery device of claim 6 wherein each of the first and second by-pass switches are movable between
a first position wherein refrigerant is prevented from flowing between the first conduit segment and the second conduit segment,
a second position wherein gaseous refrigerant is premitted to flow from the second conduit segment, through the primary flow conduit, and into the first conduit segment, when the device is in the liquid refrigerant recovery mode of operation, and
a third position wherein gaseous refrigerant is permitted to flow from the first conduit segment into the first by-pass segment, through the primary flow conduct and compressor into the second by-pass segment, and into the second conduit segment.

10. The recovery device of claim 3 wherein the first and second by-pass switches are movable between
a first position wherein refrigerant is prevented from flowing between the refrigerant storage tank and the low pressure port of the mechanical refrigeration system,
a second position wherein refrigerant is permitted to flow from the refrigerant storage tank, through the primary flow conduit and compressor, and into the low pressure port of the mechanical refrigeration system when the device is in the liquid refrigerant recovery mode of operation, and
a third position wherein refrigerant is permitted to flow from the low pressure port of the mechanical refrigeration system, into the first by-pass conduit, through the primary flow conduit and compressor, through the second by-pass conduit, and into the refrigerant storage tank.

11. The recovery device of claim 1 wherein
the second flow control means includes a compressor, and the second flow control means include switch and conduit means cooperable to permit refrigerant to flow from the refrigerant storage tank, through the compressor, and into the low pressure port of the mechanical refrigeration system when the device is in the liquid refrigerant recovery mode of operation, and from the low pressure port of the mechanical refrigeration system, through the compressor, and into the refrigerant storage tank when the device is in the gaseous refrigerant recovery mode of operation.

12. The device of claim 11 wherein the switch and conduit means includes
a first, three way by-pass switch,
a first by-pass conduit,
a second, three way by-pass switch, and
a second by-pass conduit.

13. In a recovery device for recovering refrigerant from a mechanical refrigeration system, for placement of the refrigerant into a storage tank, a selectively actuable flow control means for controlling the flow of refrigerant in a refrigerant conduit, the flow control means including
a primary flow conduit,
a compressor disposed in the primary flow conduit, the compressor being operable in both a liquid refrigerant mode of operation for pressurizing refrigerant for introduction into the mechanical refrigeration system, and being operable in a gaseous refrigerant recovery mode of operation of the recovery device,
a first by-pass switch,
a first by-pass conduit in fluid communication with the first by-pass switch and the primary flow conduit,
a second by-pass switch, and
a second by-pass conduit in fluid communication with the second by-pass switch and the second by-pass conduit,
wherein each of the first and second by-pass switches are cooperatively movable between
a first position wherein refrigerant is prevented from flowing in the refrigerant conduit between the mechanical refrigeration system and the storage tank,
a second position wherein gaseous refrigerant is permitted to flow from the storage tank into the mechanical refrigeration system when the device is in the liquid refrigerant recovery mode of operation, and
a third position wherein gaseous refrigerant is permitted to flow from the mechanical refrigeration system into the storage tank when the device is in the gaseous recovery mode of operation.

14. The invention of claim 13 further comprising a second refrigerant conduit extending between a high pressure port of the mechanical refrigeration system and the storage tank, wherein liquid refrigerant is permitted to flow through the second refrigerant conduit from the high pressure port to the storage tank when the device is in the liquid recovery mode of operation.

15. In a recovery device for recovering refrigerant from a mechanical refrigeration system, a selectively actuable flow control means for controlling the flow of refrigerant in a refrigerant conduit, the flow control means including
a primary flow conduit,
a compressor disposed in the primary flow conduit, the compressor being operable in both a liquid refrigerant mode of operation and a gaseous refrigerant recovery mode of operation of the recovery device,
a first by-pass switch,
a first by-pass conduit in fluid communication with the first by-pass switch and the primary flow conduit,
a second by-pass switch, and a second by-pass conduit in fluid communication with the second by-pass switch and the second by-pass conduit, wherein the compressor is disposed in the primary flow conduit between the first by-pass switch and the second by-pass switch, the first by-pass conduit includes a first terminus disposed at the first by-pass switch, and a second terminus disposed at the primary flow conduit between the compressor and the second by-pass switch, and the second by-pass conduit includes a first terminus disposed at the second by-pass switch, and a second terminus disposed at the primary flow conduit between the compressor and the first by-pass switch.

* * * * *